United States Patent [19]

Van Bilderbeek

[11] 4,223,920

[45] Sep. 23, 1980

[54] VERTICALLY RETRIEVABLE SUBSEA CONDUIT CONNECTOR

[75] Inventor: Bernard H. Van Bilderbeek, Ventura, Calif.

[73] Assignee: Vetco, Inc., Ventura, Calif.

[21] Appl. No.: 854,785

[22] Filed: Nov. 25, 1977

[51] Int. Cl.² .............................................. F16L 37/08
[52] U.S. Cl. ...................................... 285/24; 166/340; 285/DIG.21
[58] Field of Search ............. 285/24, 27, 18, DIG. 21, 285/106, 306; 166/338, 339, 340, 341

[56] References Cited

U.S. PATENT DOCUMENTS

| | | | |
|---|---|---|---|
| 3,023,030 | 2/1962 | Torres | 285/18 |
| 3,081,113 | 3/1963 | Haeber | 285/306 X |
| 3,098,525 | 7/1963 | Haeber | 285/DIG. 21 X |
| 3,163,223 | 12/1964 | Bauer et al. | 285/18 |
| 3,273,915 | 9/1966 | Bishop et al. | 285/18 |
| 3,488,031 | 1/1970 | Bezner et al. | 285/18 X |
| 3,701,549 | 10/1972 | Koomey et al. | 285/24 |
| 3,817,281 | 6/1974 | Lewis et al. | 285/24 X |
| 3,986,729 | 10/1976 | Taylor | 166/340 X |
| 4,126,183 | 11/1978 | Walker | 166/338 |

Primary Examiner—Thomas F. Callaghan
Attorney, Agent, or Firm—Subkow and Kriegel

[57] ABSTRACT

A manifold unit is connected to a running tool and pipe and run into position in a receptacle on a subsea template or platform to establish a flow path between fluid passages in the receptacle. Fluid supplied through the running pipe forces locking elements into locking engagement with the receptacle and the unit is forced into seating engagement in the receptacle to make a seal between the unit and the flow passages. The unit is retrievable by engaging another pipe in the unit and supplying pressure to release the locking elements.

13 Claims, 5 Drawing Figures

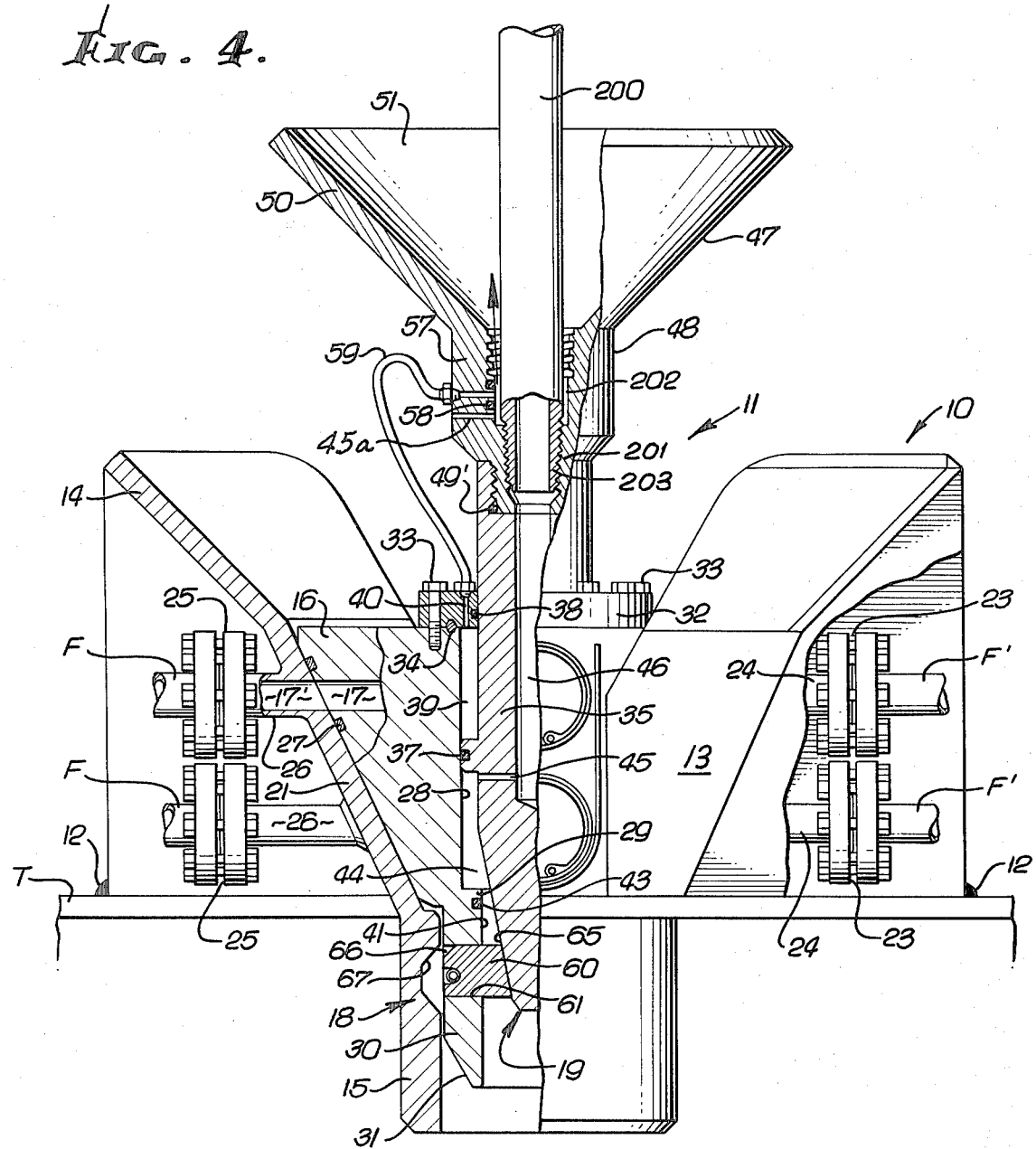

VERTICALLY RETRIEVABLE SUBSEA CONDUIT CONNECTOR

In the drilling, completion, production and servicing of wells which are completed, produced and serviced with equipment located on templates or production platforms on the floor of a body of water, the installation and servicing of various components has posed problems.

Many operations involved in producing from plural wells and from plural zones of wells require that fluid connections be made up on the template or platform and periodically the connections must be broken to enable service of the various underwater units. As examples, it may be necessary to install or remove a variety of underwater units, such as valves, chokes, flow meters, diverters, gathering manifolds, controls, flowline connectors, or the like. A common feature in such devices is the need to establish and disconnect fluid lines beneath the water.

When the water depth is so great that divers cannot be used, diving bells or complicated manipulator devices may be employed, but such operations are time consuming and costly.

Accordingly, there has been a need for enabling fluid line connecting devices which can be more easily installed and removed in deep water locations, as well as shallow water locations.

In my application for United States Letters Patent, filed Sept. 22, 1978, Ser. No. 944,714, for "THROUGH THE FLOWLINE SELECTOR APPARATUS AND METHOD", there are disclosed apparatus and a method whereby a through the flowline selector or "TFL" Selector can be installed on a template by being lowered on a running pipe string to make up simultaneously plural flowline connections and an inlet connection for TFL operations, wherein the communication between the inlet and a selected flowline is controlled by valve units through which the flowlines are connected with the various wellheads.

This application discloses means for retrievably connecting the valve units in the receptacle, but the invention relates to retrievably installing the valve unit or other flow units in the receptacle.

More particularly, the invention involves a receptacle which has at least an inlet and an oulet passage, and a retrievable unit which has at least one passage which interconnects the inlet and outlet when the unit is landed and ultimately locked in the receptacle, whereby the unit can be run on a pipe string, automatically installed in the receptacle in response to fluid pressure supplied from a vessel or platform at the top of the water, and can also be released by supplying fluid pressure through a retrieving pipe string, all without requiring a diver or complicated manipulator devices.

In accomplishing the foregoing, a receptacle is provided which has an upwardly flared guide facilitating the stabbing of the unit into the receptacle. The form of the receptacle and the unit establishes alignment between the various passages of the receptacle and the unit. Pressure fluid supplied through a running pipe string causes actuation of locking dogs into engagement with the receptacle to force metal-to-metal seals into engagement for confining fluid flow to the receptacle and unit passages. When service is necessary, the unit can be retrieved on another length of pipe engaged in the receptacle and through which pressure fluid can be supplied to release the locking elements. If fluid pressure cannot release the locking elements, the structure is such that an upward jarring action on the retrieving pipe can overcome the locking action to cause release.

The invention is illustrated as applied to an underwater valve unit or package, but is applicable to the installation of the various underwater devices enumerated above, as well as the valve unit.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 4 is a view corresponding to FIG. 3, but illustrating the retrievable component of the unit connected to a retrieving pipe string and released for vertical retrieval.

Figure 1:
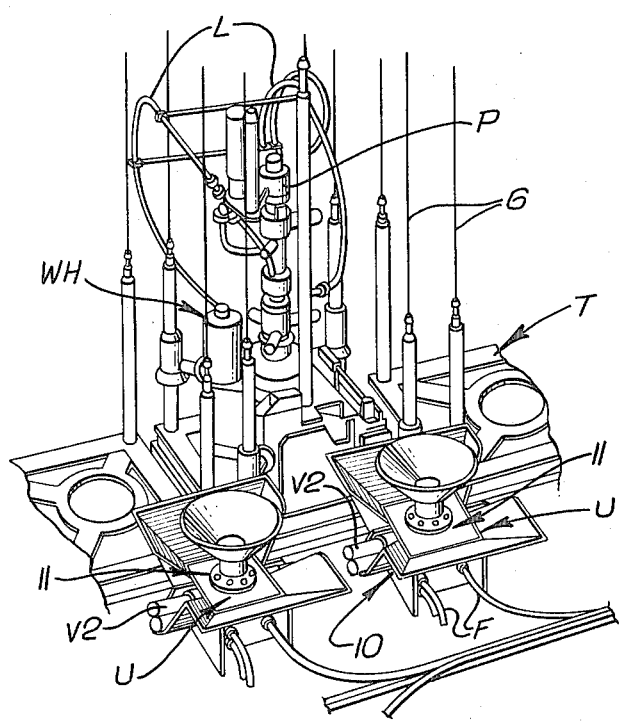
FIG. 1 is a fragmentary view in perspective illustrating the vertically retrievable unit of the invention applied to a production template for wells completed and produced from the floor of a body of water.

As seen in the drawings, referring first to FIG. 1, a template or fabricated frame structure T is shown as having a well head structure WH mounted thereon, including the usual production tree P, through which one or more well zones of a subaqueous well can be produced and serviced through the flowline selector loops L. The template T provides the usual guide posts and guidelines G, whereby the wellhead equipment including the production tree P can be lowered from a vessel afloat on the water onto the template and secured in place. A number of such wellhead structures may be mounted on the template T so that a plurality of wells can be produced and controlled from the single template. The flow of fluid to and from the well or a plurality of zones in the well via flow lines F is established by a unit U, according to the invention, which comprises a base 10 fixedly mounted upon the template T and a retrievable structure or component 11 adapted to be run into position in the base or receptacle 10 and retrieved therefrom by suitable running and retrieving tools on strings of fluid conducting pipe, as will be later described, and it is the purpose of the retrievable component or structure 11 to establish communication between one or more of the flowlines F and one or more conduits or flowlines F' (FIG. 2) which lead between the wellhead and, for example, a subsea gathering system for the produced fluid and subsea through the flowline selector apparatus, such as, for example, the vertically retrievable through the flowline selector apparatus shown and described in my above-identified copending application for United States patent. While the apparatus of the invention, as hereinafter described, will be related to the functioning of the unit U as including a retrievable valve structure, it will be understood that the retrievable structure may also be employed in connection with receptacle structures for various purposes requiring the establishment of flow path between one or more inlet and one or more outlet connections of fluid conduits to the base or receptacle structure, the unit being adapted to enable the vertical installation and retrieval of a variety of underwater equipment, such as the illustrated valves, chokes, flowmeters, various controls, flowline connectors of a simple form, manifold units, or fluid diverters, or any other type of unit useful in underwater well control and production wherein it is desired to have the capability of making and breaking a fluid connection between a pair of fluid conduits.

Figure 2:
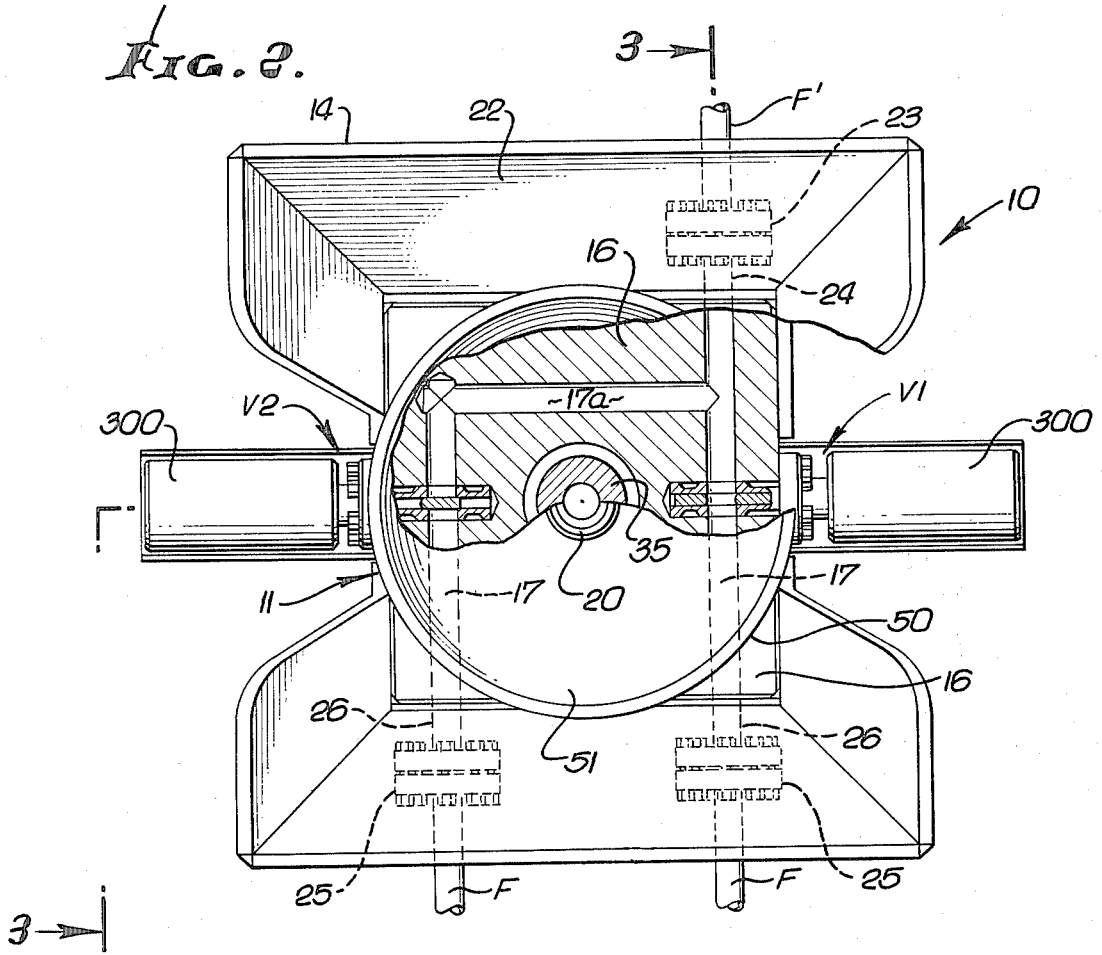
FIG. 2 is an enlarged top plan, with parts broken away, illustrating one of the units.
Figure 3:
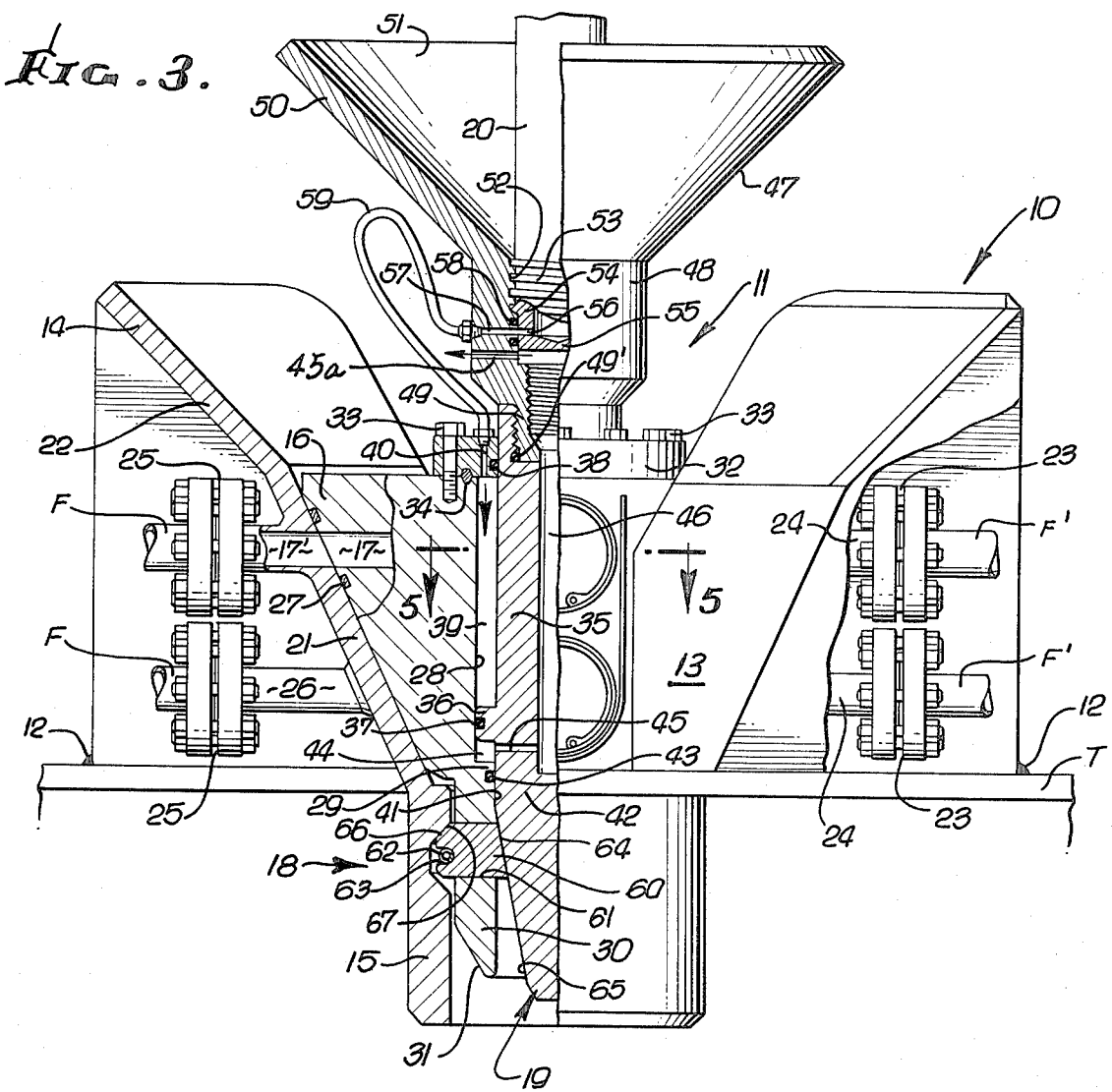
FIG. 3 is a view partly in side elevation and partly in vertical section, as taken on the line 3—3 of FIG. 2, but showing the vertically retrievable portion of the unit connected to a running pipe string and landed and latched in the receptacle.

Referring to FIGS. 2 through 4, it will be seen that the structure 10 is adapted to be fixedly mounted on the template T, say by suitable welds 12. The structure 10 includes a receptacle or body structure 13 having an upwardly and outwardly flared mouth section 14 and a downwardly extended cylindrical socket section 15. The receptacle or body section 13 is downwardly and inwardly tapered, and forms a seat for the retrievable structure 11 which includes a downwardly and inwardly tapered body 16 having at least one flow passage 17 therethrough adapted to communicate with at least one flow passage 17' at angularly spaced locations within the assembly, when the body 16 is landed in the receptacle 13. Locking means 18 are operable in response to actuator means 19 to releasably lock the body 16 in the receptacle 13, when the removable structure 11 is lowered through the water and landed in the receptacle 13 on a length of running pipe 20, as seen in FIG. 3.

In the specific form illustrated, the receptacle 13 has downwardly and inwardly inclined internal sidewalls 21 forming a rectangular or square socket, and the upwardly and outwardly flaring mouth section 14 has downwardly and inwardly inclined sidewalls 22 also forming a rectangle or square to guide the body 16 into the receptacle 13 as the body 16 is being vertically lowered into the receptacle. The rectangular or square configuration of the receptacle and the body establishes alignment of the various ports, like the ports 17 and 17', when the unit is locked together.

In the illustrated embodiment, the unit is adapted to control or establish flow between a plurality of flowlines F including a pair of vertically spaced flowlines F' and four vertically spaced flowlines F. The respective flowlines F' and F have suitable sealed flange connections 23 connecting them to conduits 24 which are integral parts of the receptacle structure. Correspondingly, the flowlines F have suitable flanged connections 25 with conduits 26 which are integral parts of the receptacle structure. When the body 16 is landed and locked in the receptacle 13, as will be later described, a seal 27 is formed at the interface between the body 16 and the receptacle 13 about the communicating ports 17 and 17'. Preferably, this seal 27 is of the well-known metallic ring gasket type adapted to be loaded between the confronting body and receptacle surfaces so as to withstand substantial differential pressure.

Referring to FIG. 3, the body 16 will be seen to have a central cylinder or bore 28 extending vertically therein and having a lower head section 29 provided by a downwardly extended nose or skirt 30 which extends downwardly into the socket member 15, the lower and outer corner of the skirt 30 having a downwardly and inwardly inclined guide surface 31 adapted to assist in centering the body within the receptacle as the body is lowered into the receptacle. At its upper end, the body has a cylinder head or flange 32 secured thereto by suitable circumferentially spaced fastenings 33, with a deformable ring gasket 34 disposed between the opposed surfaces of the head flange 32 and the body 16 to form a fluid tight seal therebetween. Incorporated in the actuator means for the locking means 18 is an inner elongated body member 35 reciprocable within the upper head flange 32 and having thereon an annular piston 36 provided with a suitable side ring or piston ring seal 37 slidably and sealingly engaged within the cylinder bore 28. A static ring seal 38 is provided within the inner periphery of the cylinder head flange 32 and slidably and sealingly engages the cylindrical outer surface of the inner body 35. Thus, there is defined between the head flange 32 and the piston 36 an upper piston chamber 39 to which pressure fluid is adapted to be supplied, as will be later described through a port 40 extending through the head flange 32. The body 16, below the bore 28 has a reduced diameter bore 41 into which the lower cylindrical end section 42 of the inner body 35 is adapted to extend, when the body 35 is in a lower position with respect to the outer body section 16. A side ring or O-ring seal 43 provides a static seal between the reduced bore 41 and the cylindrical outer surface of the body 35 when the body 35 is in the lower position as seen in FIG. 3, so as to define between the piston 36 and the lower end of the cylinder bore 28 a lower piston chamber 44, to which pressure fluid is adapted to be supplied, as will be later described, through a radial port or ports 45 leading from a central bore 46 in the body 35, outwardly beneath the annular piston 36.

Running and retrieval of the body 16 is enabled by the provision of a running and retrieving head 47 having a central body 48 provided with a downwardly extended externally threaded neck 49 which is threadedly engaged in a threaded bore in the upper end of the inner body 35, a suitable sealing ring 49' being provided in the threaded connection to prevent fluid flow therethrough. Above the body 48 of the running and retrieving head is a funnel shaped upwardly opening section 50 having an internal downwardly and inwardly tapered conical surface 51 at the apex of which is a left-hand threaded bore 52 adapted to receive the complementally threaded end 53 of the running tool or pipe string 20. At the lower end of the threaded end 53 is a cylindrical downward extension 54 adapted to extend into a bore within the body section 48 of the running and retrieving head 47. This cylindrical section 54 of the running tool is closed off at its bottom 55 and is provided with suitable radial passage means 56 adapted to communicate with passage means 57 formed in the running and retriving body section 48, and a ring seal 58 surrounds the passage means to prevent loss of fluid therefrom. A suitable connector conduit 59 is connected to the passage means 57 and to the passage 40 through the cylinder head flange 32. Thus, pressure fluid is supplied through the running tool or pipe string 20 via the passages 56 and 57 and through the conduit 59 is applied to the upper piston chamber 39 to act downwardly on the annular piston 36 to force the inner body 35 downwardly with respect to the outer body section 16, after the apparatus has been landed in the receptacle 13.

The locking means 18, in the illustrative embodiment, comprises a plurality of circumferentially spaced radially shiftable dogs or ring segments 60 disposed in radial windows 61 in the lower skirt portion 30 of the inner body 16 and normally resiliently constrained inwardly by a resilient band or spring 62 disposed about the outer periphery of the ring segments and engaged in a groove 63 therein. These dog segments have on their inner ends downwardly and inwardly inclined wedge surfaces 64 adapted to be engaged by a downwardly and inwardly inclined wedging surface 65 provided at the lower end of the inner reciprocable body 35 when the structure 11 is lowered into the receptacle 13. The locking dogs or segments 60 at their upper outer corners have downwardly and outwardly inclined wedge surfaces 66 engageable with a downwardly and outwardly inclined upper wedge surface 67 provided in the skirt portion 15 of the receptacle 13, so that as the segments 60 are forced outwardly by the wedge action between the opposing wedge surfaces 64 and 65, the wedge action of the dog surfaces 66 against the outer body surfaces 67 will also cause a downward force upon the body 16 tightly urging the tapered body into the tapered seat of the receptacle and effectively energizing the seal 27 about the flow passages 17 and 18.

When running the retrievable structure 11 from a vessel or platform atop the water on the running tool or pipe 20, as seen in FIG. 3, the piston 36 engages beneath the cylinder head flange 32, thereby supporting the weight of the ported body member 16, under which circumstances the lower end of the inner body section 35 is upwardly retracted from within the locking dogs or segments 60, so that they would be in a normally retracted or inner position allowing the lower end 30 of the body 16 to pass downwardly into the skirt 15 of the receptacle. When the inner body 16 comes to rest within the receptacle 13, the inner body 35 will continue to move downwardly, and any fluid within the lower piston chamber 44 will be displaced through the port or ports 45 and can flow upwardly through the central bore 46 of the body 35 and outwardly through the upper ports 45a which extend radially through the body section 48 of the running and retrieving head 47 below the lower closed end of the running tool. Then, the upper piston chamber 39 can be pressurized by the application of pressure fluid through the running pipe, which will force the inner body 35 downwardly into tighter wedging action with the locking dogs or ring segments 60, forcing them outwardly into wedging engagement with the wedge surface 67 of the receptacle, so that the body 16 is tightly locked in place and the seal 27 about the flow passages 17 and 18 are energized. The wedge angle of the wedge surfaces 64 and 65 of the wedge segments and the body 35 is preferably selected to be a selflocking angle, so that the body 35 will be held in a downward position. This locking effect between the locking dog segments and the body 35 can also hold the body 35 against rotation within the body 16, so that the running tool and pipe string 20 can be rotated out of the threaded connection with the running and retrieving head 47. Otherwise suitable holding means can be provided for positively preventing the body from rotating with the running pipe.

When it is desired to remove the retrievable structure 11 from the receptacle structure 10 a drill pipe string 200 can be lowered from the drilling rig on the surface of the water into the stabbing bell or funnel 50. The retrieving pipe string 200 has a lower threaded pin 203 adapted to be made up in the threaded box 201 provided within the body section of the retrieving head 47. Then, fluid under pressure can be supplied through the retrieving pipe string 200 and will find access through the radial ports 45 into the lower piston chamber 44, and can act upwardly on the piston 36 to force the lower end of the body 35 upwardly relative to the locking dogs 60, overcoming the locking wedge effect therebetween, so that the locking dogs are free for inward movement.

Fluid in the upper piston chamber 39, during the initial upward movement of the piston 36, is displaced through the conduit 59 and the port 56 in the running and retrieving head into the annular clearance space 202 defined between the lower end of the retrieving pipe string 200 and the sealing bore in the running and retrieving head. Alternatively, instead of utilizing fluid pressure to relieve the locking means, or if necessary, in addition to the utilization of such fluid pressure, it will be appreciated that an upward jarring action can be applied to the retrieving pipe 200 to release the locking wedge effect of the locking and actuator means.

As seen in FIG. 4, as the running and retrieving head and body 35 are moved progressively upwardly, the locking dog segments 60 are enabled to shift radially inwardly, freeing the lower end of the body 16 for upward movement from within the receptacle. The body 16 is elevated upon continued upward movement of the retrieving pipe string 200 by engagement of the piston 36 beneath the head flange 32.

Figure 5:
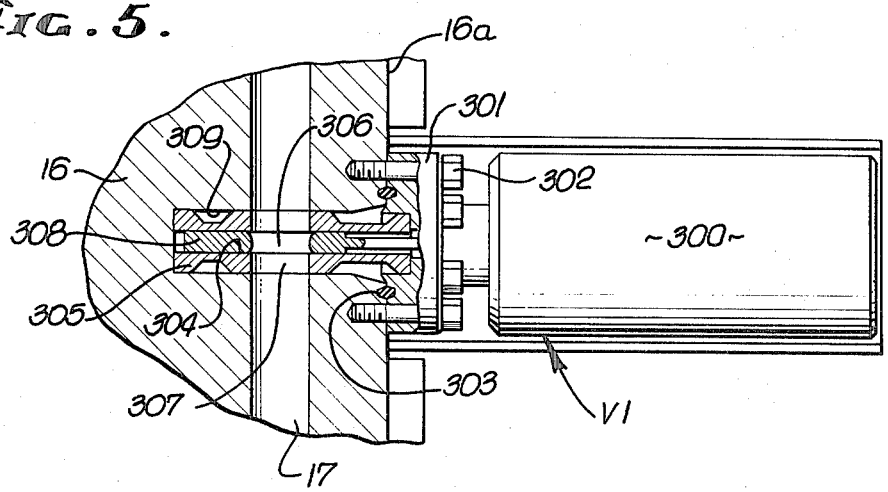
FIG. 5 is a fragmentary view partly in elevation and partly in section, as taken on the line 5—5 of FIG. 3.

In the embodiment of the invention specifically illustrated herein, the flowlines F' and F are interconnected through the retrievable structure 11, whereby fluid can flow between the respective vertically spaced connector conduits 24 and 26. One such arrangement is illustrated in FIG. 2, wherein flow between the flowlines F and flowlines F' is controlled by a pair of valves V1 and V2. Each of the valves, V1 and V2, is of a known form, and as seen in FIG. 5, the representative valve V1 comprises a valve actuator 300 having a mounting flange 301 secured by fastenings 302 to a sidewall 16a of the retrievable body member 16, a suitable ring gasket 303 forming a fluid tight seal therebetween. The valve includes a ported valve slide 304 reciprocable in a ported guide 305, between the open position in which the port 306 through the slide 304 is aligned with the port 307 through the guide, and a retracted position, at which the port 307 would be blanked off by the end section 308 of the valve slide. The guide 305 is disposed in a slot or bore 309 in the body 16 which is intersected by the passageways 17 in the body 16 at the right-hand side of the structure of FIG. 2, so that when the valve V1 is in the open position, fluid can communicate between the flowlines F' and F at the right-hand side of the structure of FIG. 2. At the left-hand side of the structure of FIG. 2, the valve V2, which corresponds to the valve V1 shown in FIG. 5, is adapted to be actuated between the open and closed positions to establish communication between the body passage 17 connected with the flowline F' and the body passage 17 connected with flowline F at the lower left of FIG. 2 via a branch passage 17a. As illustrated in FIG. 2, flow can occur through the valve V1 but cannot occur through the valve V2. Closure of the valve V1 and opening of the valve V2, apparently establishes the alternate flowpath between the flowline F' and flowline F.

As previously indicated, the specific nature of the porting through the body 16 and the use of the valves to control flow through such porting is not germane to the present invention. The significant point is that intercommunication between various flowlines connected to the fixed structure 10 on the subsurface template can be easily established by simply lowering the retrievable structure 11 into the receptacle and locking the structure together with the flowlines in communication and sealed against leakage by the seal rings 27.

From the foregoing, it will be seen that the present invention provides structure facilitating the making up of underwater connections by lowering a vertically retrievable connector body into a receptacle having fluid lines which intercommunicate through the body, without requiring that the connections be made up under the difficult and hostile environment of deep water.

I claim:

1. Underwater fluid conduit connector apparatus comprising: a body structure having first passage means for the flow of fluid through said body structure; said body structure including means connectable with a pipe string for lowering said body structure in the water; a receptacle having an open upper end; means for mounting said receptacle at the bottom of the water and providing fluid inlet and outlet conduits; said receptacle having ports in communication with said conduits; said receptacle and said body structure having means for aligning said passage means with said ports upon lowering of said body structure into said receptacle; fluid pressure operated locking means for releasably locking said body structure in said receptacle; and operating fluid passage means in said body structure for conducting operating fluid pressure from said pipe string to said locking means.

2. Underwater fluid conduit connector apparatus as defined in claim 1; said body structure including a first body section having said means connectable to a pipe string; a second body section shiftably connected with said first body section and having said first passage means therethrough; said locking means being operable in response to downward movement of said first body section with respect to said second body section when said body structure is lowered into said receptacle.

3. Underwater fluid conduit connector apparatus as defined in claim 1; said body structure and said receptacle having downwardly and inwardly inclined surfaces providing a seal about said passage means and ports, and said locking means having means for forcing said body into said receptacle to load said inclined surfaces of said body and receptacle towards one another.

4. Underwater fluid conduit connector apparatus as defined in claim 1; including fluid pressure operated means for releasing said locking means; said body having additional operating fluid passage means for conducting operating fluid pressure to said releasing means; and said body having means for connection with a retrieving pipe string for conducting operating fluid to said additional passage means.

5. Underwater fluid conduit connector apparatus as defined in claim 2; said locking means including means for releasing said body structure from said receptacle responsive to an upward force on said first body section; said first body section having means for connection with retrieving means for applying said upward force.

6. Underwater fluid conduit connector apparatus as defined in claim 2; including fluid pressure operated means for releasing said locking means; said body structure having additional operating fluid passage means for conducting operating fluid pressure to said releasing means; and said first body section having means for connection with a retrieving pipe string for conducting operating fluid to said additional passage means, said locking means including means for releasing said body structure from said receptacle responsive to an upward force applied to said first body section by said retrieving pipe string.

7. Underwater fluid conduit connector apparatus as defined in claim 1; said body structure including a first body section having said means connectable to a pipe string; a second body section shiftably connected with said first body section and having said first passage means therethrough; said locking means being operable in response to downward movement of said first body section with respect to said second body section when said body structure is lowered into said receptacle, said fluid pressure operated locking means including means on said body sections forming a piston chamber and a piston on said second body section responsive to said operating fluid pressure to effect said downward movement of said first body section.

8. Underwater fluid conduit connector apparatus as defined in claim 1; said body structure including a first body section having said means connectable to a pipe string; a second body section shiftably connected with said first body section and having said first passage means therethrough; said locking means being operable in response to downward movement of said first body section with respect to said second body section when said body structure is lowered into said receptacle, said fluid pressure operated locking means including means on said body sections forming a piston chamber and a piston on said second body section responsive to said operating fluid pressure to effect said downward movement of said first body section, and another piston chamber and piston on said first body section responsive to operating fluid pressure to effect upward movement of said first body section to release said locking means.

9. Underwater fluid conduit connector apparatus as defined in claim 8; said locking means having means responsive to an upward force applied to said first body section; and means for connecting said first body section to a pulling tool.

10. Underwater fluid conduit connector apparatus as defined in claim 2; said locking means having means responsive to an upward force applied to said first body section; and means for connecting said first body section to a pulling tool.

11. Underwater fluid conduit connector apparatus comprising; an outer body member having passage means therethrough; and inner body member reciprocably disposed in said outer body member; running and retrieving means on said inner body member connectable to running and retrieving tools;

a receptacle having fluid conduit connectors, including ports communicating with said passage means through said body; and initially retracted outwardly expandable locking means releasably engaged with said receptacle to hold said outer body member in said receptacle; said inner body member having means for expanding said locking means responsive to longitudinal movement in said outer body member in one direction; fluid pressure responsive means for moving said inner body in said one direction including passage means for receiving pressure fluid from a running tool.

12. Underwater fluid conduit connector apparatus as defined in claim 11; and fluid pressure responsive means for moving said inner body in the other longitudinal direction to release said locking means including passage means for receiving pressure fluid from a retrieving tool.

13. Underwater fluid conduit connector apparatus as defined in claim 11; said outer body having spaced cylinder heads and a cylinder bore between said heads, said inner body having a piston shiftable in said bore between said heads; and passage means for conducting pressure fluid to and from said bore at opposite sides of said piston from running and retrieving tools connected with said inner body.

* * * * *